United States Patent [19]

Stalder et al.

[11] Patent Number: 5,075,968
[45] Date of Patent: Dec. 31, 1991

[54] METHOD FOR PRODUCTION OF AN AIR JET NOZZLE

[75] Inventors: Herbert Stalder, Kollbrun; Werner Oeggerli, Beinwil am See, both of Switzerland

[73] Assignee: Maschinenfabrik Rieter AG, Winterthur, Switzerland

[21] Appl. No.: 573,637

[22] Filed: Aug. 24, 1990

[30] Foreign Application Priority Data

Aug. 25, 1989 [CH] Switzerland .................. 03095/89

[51] Int. Cl.$^5$ .................. B21D 53/00; B21K 29/00; B23P 15/26
[52] U.S. Cl. .................. 29/890.142; 29/890.143
[58] Field of Search .................. 29/890.01, 890.142, 29/891.143; 239/DIG. 9, 403

[56] References Cited

U.S. PATENT DOCUMENTS

| | | | |
|---|---|---|---|
| 2,318,769 | 5/1943 | Freeman et al. | 29/890.143 |
| 4,432,497 | 2/1984 | Wöste | 29/890.142 X |
| 4,502,196 | 3/1985 | Kupper et al. | 29/890.142 |
| 4,663,811 | 5/1987 | Gellert | 29/890.142 |
| 4,733,447 | 3/1988 | Ageishi | 29/890.1 |
| 4,764,180 | 8/1988 | Shaddock | 29/890.142 |
| 4,766,657 | 8/1988 | Singer | 29/890.1 |
| 4,801,095 | 1/1989 | Banzhaf et al. | 29/890.142 X |
| 4,897,907 | 2/1990 | Kopiec et al. | 29/890.142 X |

*Primary Examiner*—Timothy V. Eley
*Assistant Examiner*—C. Richard Martin
*Attorney, Agent, or Firm*—M. Lawrence Oliverio

[57] ABSTRACT

Method of forming a nozzle for use in air jet thread spinning processes, the nozzle comprising a body of selected steel material having a thread passage with an axis extending the longitudinal length of the body and one or more lateral bores entering tangentially into the passage, the method comprising the steps of selecting a raw unhardened steel material which is hardenable by heat or nitriding treatment; forming the body of the nozzle including the passage and the lateral bores out of the selected raw steel material; and hardening the formed body of raw steel material to a hardness of at least about 50 HRC.

16 Claims, 1 Drawing Sheet

METHOD FOR PRODUCTION OF AN AIR JET NOZZLE

BACKGROUND OF THE INVENTION

The present invention relates to spinning nozzles and methods of making nozzles for a spinning machine and in particular to spinning nozzles having a passage extending the longitudinal direction of the nozzle and lateral bores leading tangentially into the passage.

Nozzles for air jet spinning machines operating on the pneumatic spinning principle have long been known (for example see DE-A-32 37 990). This specification describes the invention in the context of a spinning machine having two twist nozzles, more particularly a first or injector nozzle and a second or twist nozzle. These nozzles have lateral bores which typically have a diameter of less than 1 mm.

Air jet nozzles are increasingly complex in shape and require passage and bore diameters with increasingly accurate tolerances with as yet unsuitable production methods being available for producing same. It has been essentially impossible to satisfy such stringent requirements as dimensional tolerances while at the same time guaranteeing very high wear-resistance.

SUMMARY OF THE INVENTION

It is an object of the invention therefore to provide a method for producing a nozzle for a spinning machine which guarantees very high wear-resistance and very high dimensional and directional accuracy of the bores, the nozzles being adapted to particularly cost-effective manufacture by comparison with conventional production processes. A novel nozzle is also provided which may be produced according to the novel method herein.

Bores to be formed in a hardened and wear resistant metal housing can be made only with very great difficulty; i.e., special jigs and specially hardened bits or special drilling methods are required to ensure that the direction of the bore is in any way accurate, and, even if the drilling fixtures are properly clamped, there is a risk of the drilling bit deviating such that the bore departs from an ideal geometry. For example, where a cylindrical bore is desired, an elliptical bore may be formed. In looking for suitable production methods for such nozzles it has been found particularly advantageous to make the bores before hardening of the nozzle material thus achieving high dimensional and directional accuracy of the bores. It has been found that such hardening process has practically no appreciable effect on the quality of the bores.

It is an object of the invention to provide wear resistant nozzles for nozzle spinning machines cost effectively and with accurate dimensions. Manufacture of the bores is not restricted to conventional mechanical methods. Casting, powder metallurgy methods, ultrasonic machining or erosion, and electron or laser beam treatments can also be employed.

Heat treatment of the nozzle material is preferably carried out at the material specific hardening temperature or at the nitriding temperature of the nozzle body material, typically steel, which is used.

Mechanical or chemical polishing processes are typically used to finish the surfaces of the bores and passage. Suitable mechanical methods are shot blasting with glass beads or suspension blasting with corundum. Another suitable method is longitudinal polishing using a cord and polishing paste.

Selection of steel material should primarily be governed by the fact that the steel should not excessively deform during heat treatment or hardening. Particularly suitable commercially available steels are, for example, those designated as X40Cr13, 100MnCrW4, 34CrAlMo5 or ETG 100 (all available from VEW, Vereinigte Edelstahlwenke AG, Vienna, Austria).

The new production method has proved particularly suitable for nozzles in which the diameter to length ratio of the bores is between about 1:3 and about 1:8, most preferably about 1:5. The diameter of the bores is preferably between about 0.3 and about 1.0 mm, preferably about 0.5 mm and the passage preferably has a cross sectional diameter of between about 2.0 and about 4.0 mm, most preferably about 2.5 mm. The angle of the bores with the longitudinal axis of the passage is typically between about 30° and about 90°, most preferably about 45°.

DETAILED DESCRIPTION OF PREFERRED EMBODIMENTS

Figure 1:
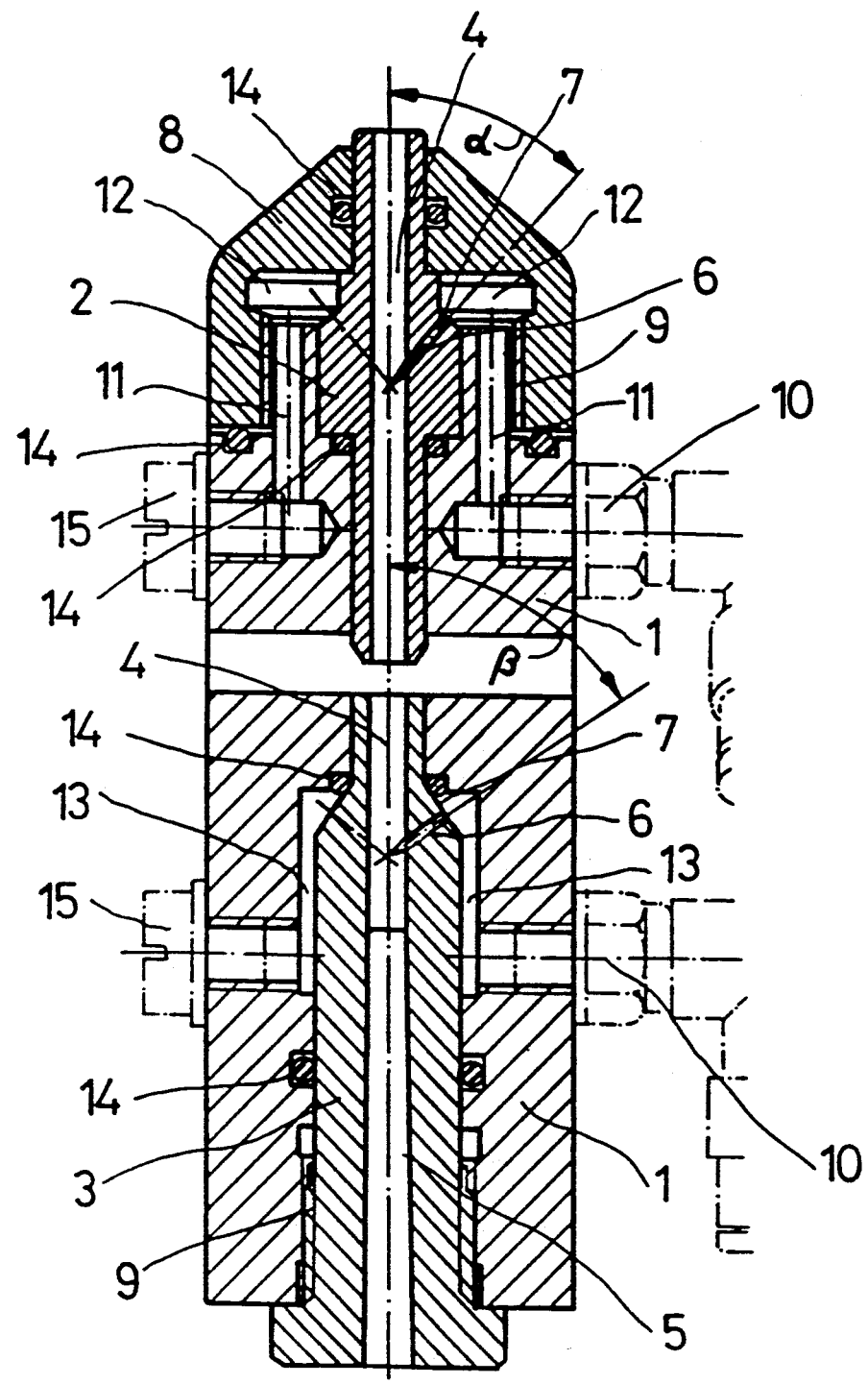

Further advantages of the invention will be apparent from the following description which explains the invention in detail with reference to one exemplified embodiment illustrated in the drawing, the single Figure of which shows a nozzle housing with two nozzles.

FIG. 1 shows a nozzle housing 1 comprising an injector nozzle 2 and a twist nozzle 3 having a coaxially aligned passage 4. The passage 4 of the twist nozzle 3 has a conically widened end 5. Each of the nozzles 2 and 3 is formed with three lateral tangential bores 6, only one of which is shown in each case. The bores 6 lead tangentially into the passage 4, the bore 6 of nozzle 2 forming an angle $\alpha$ of 45° with the longitudinal direction (or axis) of the passage 4 while the bore 6 of the twist nozzle 3 forms an angle $\beta$ of 60° with the longitudinal direction of the passage 4. The bores 6 of the injector nozzle 2 enter substantially into about the middle of the length of passage 4. Chamfers or surfaces 7 are provided on the outsides of the nozzles 2 and 3 and are disposed perpendicularly to the longitudinal direction (or axis) of the bores 6. These chamfers 7 provide easy and accurate location of the drilling head so that the bores 6 can be readily formed to the accurate dimensions and direction. The injector nozzle 2 is screwed on the nozzle housing 1 by means of a cap 8 having a screwthread 9. The nozzle housing 1 is formed with two air inlets 10 intended for the air supply. In the case of the injector nozzle 2, the air passes via a continuous bore 11 extending parallel to the passage 4 into an air chamber 12 connected to the bores 6. In the case of the twist nozzle 3, an annular recess 13 is provided which communicates with the air inlet 10 and the bores 6. For sealing purposes, O-rings 14 are provided between the nozzles 2 and 3 and the nozzle housing 1. For reasons associated with manufacturing and assembly techniques, air inlets 10 are typically formed in the nozzle housing 1 on both sides of the nozzles 2 and 3, the unused air inlets 10 being closed by a screw 15. The bores 6 most preferably have a diameter of 0.5 mm and a length of at least about 2.5 mm. It has proven particularly satisfactory for the length of the bores 6 to be about five times their diameter.

The injector nozzle 2 and the twist nozzle 3 may be formed, in a preferred exemplary manner, as follows:

In a first step, the nozzles 2 and 3 are formed from unhardened steel and the passage 4 and the bores 6 are formed therein. Typically, the passage 6 and the bores 4 are formed by drilling with a drilling machine and a suitable steel bit. Other methods can be used however, such as ultrasonic drilling or erosion, or laser or electron beams. Alternatively, the nozzles can be made directly by casting or powder-metallurqical methods, such as hot pressing. Such alternative methods require a suitable casting or hot-pressing mould.

In a second step, the nozzles 2 and 3, which now have the required rough form are surface treated by removing burrs and other irregularities by shot blasting or by suspension blasting. Such finishing operation is typically effected by shot blasting using glass shot of a diameter of 150 to 250 μm, and a blasting pressure of 3 to 7 bar, most typically 5 bar. Another suitable surface finishing operation may be effected by blasting with a suspension of corundum having a particle size of typically about 20 to about 100 μm, most preferably about 40 μm, and water at a blasting pressure of 4 to 8 bar, most typically at about 6 bar.

Similarly, the passage 4 and the bores 6 can be longitudinally (axially) polished by means of a cord and polishing paste. Another polishing method is of a chemical type and is explained in detail, for example, in an article by F H Wells, *Electroplating and Metal Finishing*, June 1960, pages 241 et seq., the disclosure of which is incorporated herein by reference.

In a third and last step, the nozzle 2 or 3 is preferably subjected to a heat treatment which is typically carried out in a buffer gas or in a vacuum depending on the particular composition of steel used (exemplary preferred heat treatments versus exemplary steel materials are set forth in Table 1.) The heat treatment of the unhardened raw steel nozzle is carried out in such a way and to such an extent as to achieve a nozzle body material hardness of at least about 50 HRC (HRC is also known as the Rockwell C hardness). More particular details as to preferred heat treatment operations are set forth in DIN Standard 17211 (nitriding steels; quality specifications) and DIN Standard 1651 (free cutting steels) and DIN Standard 17440 the disclosures of which are incorporated herein by reference. Nozzles 2 and 3 prepared in this way have a very low surface roughness of RA=0.1, i.e. the passage 4 and the bores 6 have a maximum deviation of 0.5 μm. The heat treatment operation can alternatively be carried out by high-frequency hardening also known as induction hardening, as described for example in Dubbel, *Taschenbuch fur den Maschinenbau*, Springer Verlag (1987) p. E 32 and U.S. Pat. No. 4,167,846, the disclosures of which are incorporated herein by reference.

Nozzles 2 and 3 made in the above described manner have bores 6 leading tangentially into the passage 4 with a very high accuracy in respect of the dimensions and direction which were originally given the passage 4 and boxes 6 before the nozzle body was subjected to the hardening process. The production process proposed has proved particularly cost-effective, since the sequence of process steps to manufacture the nozzle can be substantially automated.

TABLE 1

| Type of Steel | Hardening Method |
| --- | --- |
| X40Cr13 | Vacuum or buffer gas hardening |
| | Hardness HRC 54 ± 2 |
| | Hardening temperature 1000- |

TABLE 1-continued

| Type of Steel | Hardening Method |
| --- | --- |
| | 1050° C. |
| | Annealing temperature 180° C. |
| 100MnCrW4 | Hardness HRC 62 ± 0.2 |
| | Hardening temperature 780–830° C. |
| | Quenching in oil |
| | Annealing temperature 180° C. |
| 34CrAlMo5 | Gas nitriding |
| (Nitriding steel) | Hardness HV3 1100 ± 100 |
| | Hardness layer 0.3–0.4 mm |
| ETG 100 | Bath nitriding |
| (Equivalent to 45S20) | (Tenifer treatment) |
| | Thickness of nitride layer 10 to 20 μm |

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. Method of forming a nozzle for use in air jet thread spinning processes, the nozzle comprising a body of selected steel material having a thread passage with an axis extending the longitudinal length of the body and one or more lateral bores entering tangentially into the passage, the method comprising the steps of:

selecting a raw unhardened steel material which is hardenable by heat or nitriding treatment;

first forming the body of the nozzle including the passage and the lateral bores out of the selected raw unhardened steel material; and, subsequently, hardening the formed body of raw unhardened steel material to a hardness of at least about 50HRC.

2. The method of claim 1 wherein the step of forming comprises forming the passage and the lateral bores in the body of raw steel material to selected geometries by a physical treatment of the raw steel material selected from the group of mechanical drilling, mechanical milling, casting, powder metallurgical pressing, erosion, ultrasound, laser and electron beam treatments and combinations of two or more of the foregoing physical treatments.

3. The method of claim 2 wherein the step of forming further comprises surface treating the formed unhardened nozzle body to remove irregularities at least from the surfaces of the passage and the bores, the surface treatment being selected from the group of blasting and polishing.

4. The method of claim 2 wherein the step of hardening comprises heating the formed body at the material-specific hardening temperature or the nitriding temperature of the selected steel material.

5. The method of claim 4 wherein the step of forming further comprises surface treating the formed unhardened nozzle body to remove irregularities at least from the surfaces of the passage and the bores, the surface treatment being selected from the group of blasting and polishing.

6. The method of claim 5 wherein the surface treatment comprises blasting the surfaces of the formed unhardened body with glass shot having a diameter of between about 150 and about 250 μm.

7. The method of claim 5 wherein the surface treatment comprises blasting the surfaces of the formed unhardened body with a suspension including corundum having a grain size of between about 20 and about 100 μm.

8. The method of claim 5 wherein the surface treatment comprises coating the surfaces of the passage and the bores in the formed unhardened body with a polishing paste and polishing the coated surfaces with a polishing cord.

9. The method of claim 1 wherein the step of hardening comprises heating the formed body at the material-specific hardening temperature or the nitriding temperature of the selected steel material.

10. The method of claim 3 wherein the step of forming further comprises surface treating the formed unhardened nozzle body to remove irregularities at least from the surfaces of the passage and the bores, the surface treatment being selected from the group of blasting and polishing.

11. The method of claim 1 wherein the step of forming further comprises surface treating the formed unhardened nozzle body to remove irregularities at least from the surfaces of the passage and the bores, the surface treatment being selected from the group of blasting and polishing.

12. The method of claim 11 wherein the surface treatment comprises blasting the surfaces of the formed unhardened body with glass shot having a diameter of between about 150 and about 250 μm.

13. The method of claim 11 wherein the surface treatment comprises blasting the surfaces of the formed unhardened body with a suspension including corundum having a grain size of between about 20 and about 100 μm.

14. The method of claim 11 wherein the surface treatment comprises coating the surfaces of the passage and the bores in the formed unhardened body with a polishing paste and polishing the coated surfaces with a polishing cord.

15. The method of claim 1 wherein the formed body of raw unhardened steel material is uniformly hardened in the step of hardening.

16. Method of forming a high precision fluid injection nozzle, the nozzle comprising a body of selected steel material having a central axial passage extending the longitudinal length of the body and one or more lateral bores entering tangentially into the passage, the method comprising the steps of:

selecting a raw unhardened steel material which is hardenable by heat or nitriding treatment;

forming the body of the nozzle including the passage and the lateral bores out of the selected raw unhardened steel material, at least the lateral bores being formed in the raw unhardened steel to precise selected dimensions; and, subsequently, hardening the formed body of raw steel material such that the precise selected dimensions of the lateral bores are substantially maintained upon completion of the hardening.

* * * * *